United States Patent [19]

Pfau et al.

[11] 4,363,949
[45] Dec. 14, 1982

[54] TRAVELLING WIRE EDM APPARATUS

[75] Inventors: Jean Pfau, Collonge-Bellerive; Benno I. Bonga, Crans, both of Switzerland

[73] Assignee: Ateliers des Charmilles S.A., Geneva, Switzerland

[21] Appl. No.: 208,934

[22] Filed: Nov. 21, 1980

[30] Foreign Application Priority Data

Dec. 21, 1979 [CH] Switzerland ................ 11390/79

[51] Int. Cl.³ .............................................. B23P 1/08
[52] U.S. Cl. ................................................ 219/69 W
[58] Field of Search ................ 219/69 W, 69 M, 69 C

[56] References Cited

U.S. PATENT DOCUMENTS 3,731,044 5/1973 Ullmann et al. ............... 219/69 W
3,731,045 5/1971 Ullmann et al. ............... 219/69 W
3,849,624 11/1974 Dulebohn et al. .............. 219/69 W Primary Examiner—C. C. Shaw
Attorney, Agent, or Firm—Hauke and Patalidis

[57] ABSTRACT

A correction system for a travelling wire EDM machine cutting a workpiece by means of a travelling electrode wire stretched between two guide members and comprising a pair of servo motors for effecting displacement of the guide members relative to their respective support arms, such as to incline the electrode wire relative to the workpiece for providing the cut in the workpiece with an appropriate predetermined conicity or draft. One of the servo motors providing such displacement is, in addition, controlled such as to compensate for thermally-induced expansions or contractions of one of the support arm guide members relative to the other.

3 Claims, 2 Drawing Figures

FIG. I

TRAVELLING WIRE EDM APPARATUS

BACKGROUND OF THE INVENTION

The present invention relates to an EDM apparatus and more particularly to a travelling wire EDM apparatus wherein a workpiece is cut, by electrical discharges, by means of an electrode tool in the form of a wire.

In EDM apparatus of that type, the travelling wire electrode is supported by a pair of guide members each mounted on the end of a support arm and disposed one on one side and the other on the other side of the machining zone. A pair of servo motors displace the pair of wire guide members relative to the workpiece according to a predetermined path for the cut in the workpiece, and an additional pair of servo motors may be used for displacing the wire guide members relative to each other, such as to provide the active portion of the electrode wire with a predetermined inclination relative to the workpiece in the course of a cutting operation.

Means are known for disposing the active portion of electrode wire at an angle relative to the cutting path plane, such means consisting in effecting a relative displacement between the wire guide members either in polar co-ordinates, for example by means of eccentrically rotating devices, or in cartesian or planar co-ordinates by means of cross-slides mounted on the end of one of the arms supporting a wire guide member.

The known methods and systems present the inconveniences of lacking in precision because the displacement of the wire guide members is the resultant of two super-imposed displacements, resulting in backlash, loss of rigidity and compounding of errors. In addition, the mechanism mounted on the end of one of the support arms is voluminous and leads to a machine design which is more complex and more costly.

The present invention eliminates the inconveniences of the prior art and provides an apparatus in which one of the electrode wire guide members is displaced on one of the support arms in one direction, and the other guide member is displaced on its support arm in an other direction.

SUMMARY OF THE INVENTION

The invention provides a structure for a travelling wire EDM apparatus which permits to increase substantially the precision with which the electrode wire is displaced while insuring a constant control of the inclination of the wire relative to the workpiece in the course of a cutting operation, such a control being achieved by simultaneous control of both the displacements of the wire guide support arms and of the workpiece and of additional displacements of the pair of guide members each relative to its respective support arm.

Another advantage of the invention is to permit to utilize the displacement of an electrode wire guide member in the same direction as the displacement of its corresponding support arm for compensating thermally-induced variations in the length of the support arms without intervention from the numerical control system providing the cutting path.

Under normal conditions, during the set-up operation preceding the actual machining of the workpiece, the machining fluid is withdrawn into a storage tank and the wire guide support arms are both subjected to the same temperature. During machining, the lower support arm is either immersed in the machining fluid or continuously washed by the machining fluid and therefore reaches a temperature which is substantially that of the machining fluid. The resulting difference in temperature between the upper and the lower support arms causes a non-negligible variation in the length of the lower arm relative to the upper arm, causing a substantial machining error which can be as high as ten or so microns. The machining error is eliminated in the present invention by effecting an auxiliary displacement of the wire guide member situated below the workpiece as a function of the temperature of its member support arm. In this manner, an exact compensation of the variations of the length of the support arm, due to thermal expansion and contraction, is thus achieved.

The many objects and advantages of the present invention will become apparent to those skilled in the art when the following description of the best mode contemplated for practicing the invention is read in conjunction with the accompanying drawing showing, for illustrative purpose only, a structural example of a travelling wire EDM apparatus according to the present invention and in which:

DETAILED DESCRIPTION OF THE PREFERRED EMBODIMENT

Figure 1:
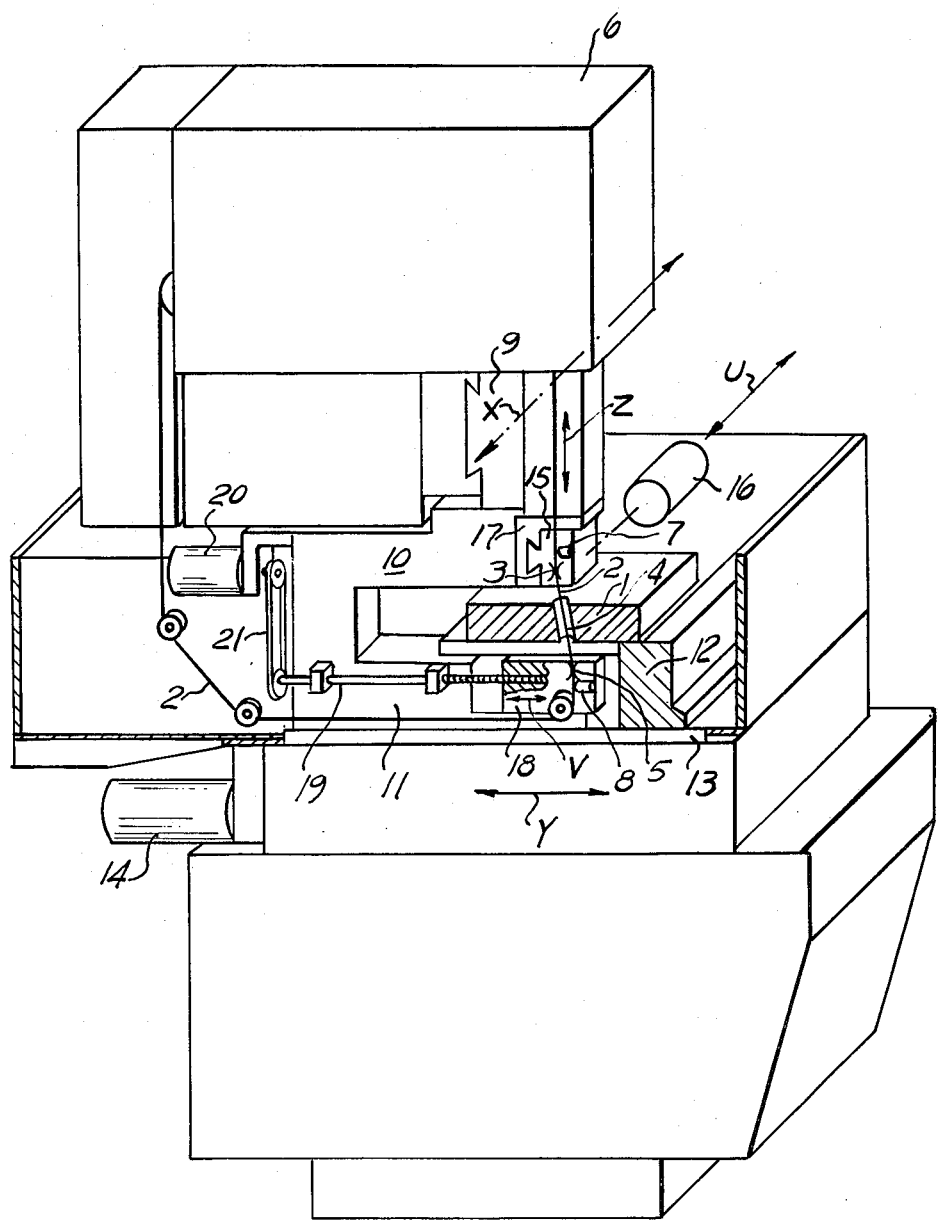
FIG. 1 is a simplified schematic representation of an EDM apparatus according to the invention.

The travelling wire EDM apparatus of FIG. 1 is designed for effecting a cut in an electrode workpiece 1 by way of an electrode tool in the form of a wire 2, according to a cutting path or trajectory defined by numerical control. The wire 2, in the course of its longitudinal or axial displacement, travels successively through an upper guide member 3, the machining zone 4, and a lower guide member 5, before being returned to an enclosure 6 disposed on the top of the apparatus, the enclosure 6 containing a supply of the wire and the appropriate arrangement for feeding the wire and adjusting the pull exerted on the wire during travel through the machining zone 4.

The workpiece 1 is connected to one of the terminals of a pulse generator, not shown at FIG. 1, and the other terminal of the pulse generator is connected to both electrical slide contacts 7 and 8 which are disposed one on each side of the machining zone 4, and which are adapted to supply machining current to the wire 2.

The pre-programmed cutting path is obtained by simultaneously displacing the wire guide members 3 and 5 in a direction, or X-axis, by means of a slide 9 on which are mounted the two wire guide support arms 10 and 11, on which are in turn mounted the guide members 3 and 5, respectively. The workpiece 1 and its support member 12 are mounted on a table 13 which is displaced along the Y-axis by a servo motor 14.

The upper guide member 3 and the associated electrical contact 7 are affixed to a carriage 15 displaceable by a servo motor 16 in a direction U, parallel to the X-axis. The carriage 15 is supported by a support member 17 which can be manually displaced relatively to the workpiece 1 along a vertical, or Z-axis, such as to set the position of the carriage 15 in height according to the height of the workpiece 1.

The wire lower guide member 5 and its associated contact 8 are mounted on a second carriage 18 displaceable on the support arm 11 in a direction V, which is parallel to the Y-axis, by means of a jack-screw 19 driven in rotation by a servo motor 20 through a chain drive 21. This arrangement permits to locate the servo motor 20 outside of the tank 22 in which the workpiece 1 is mounted and in which machining fluid is introduced.

During machining, the servo motors 16 and 20 are controlled according to the predetermined program of the cutting path by the machine numerical control system, such as to maintain a predetermined inclination of the wire relative to the workpiece 1 or, eventually, varying the angle of inclination of the wire during machining.

The displacement of the carriage 18 along the axis V of the support arm 11 permits to compensate for changes in length of the support arm due to thermal effect. Such compensation can be achieved independently of the machine numerical control system, for example by measuring temperature variations of the support arm 11 and by controlling the servo motor 20 in response to such temperature variations.

Figure 2:
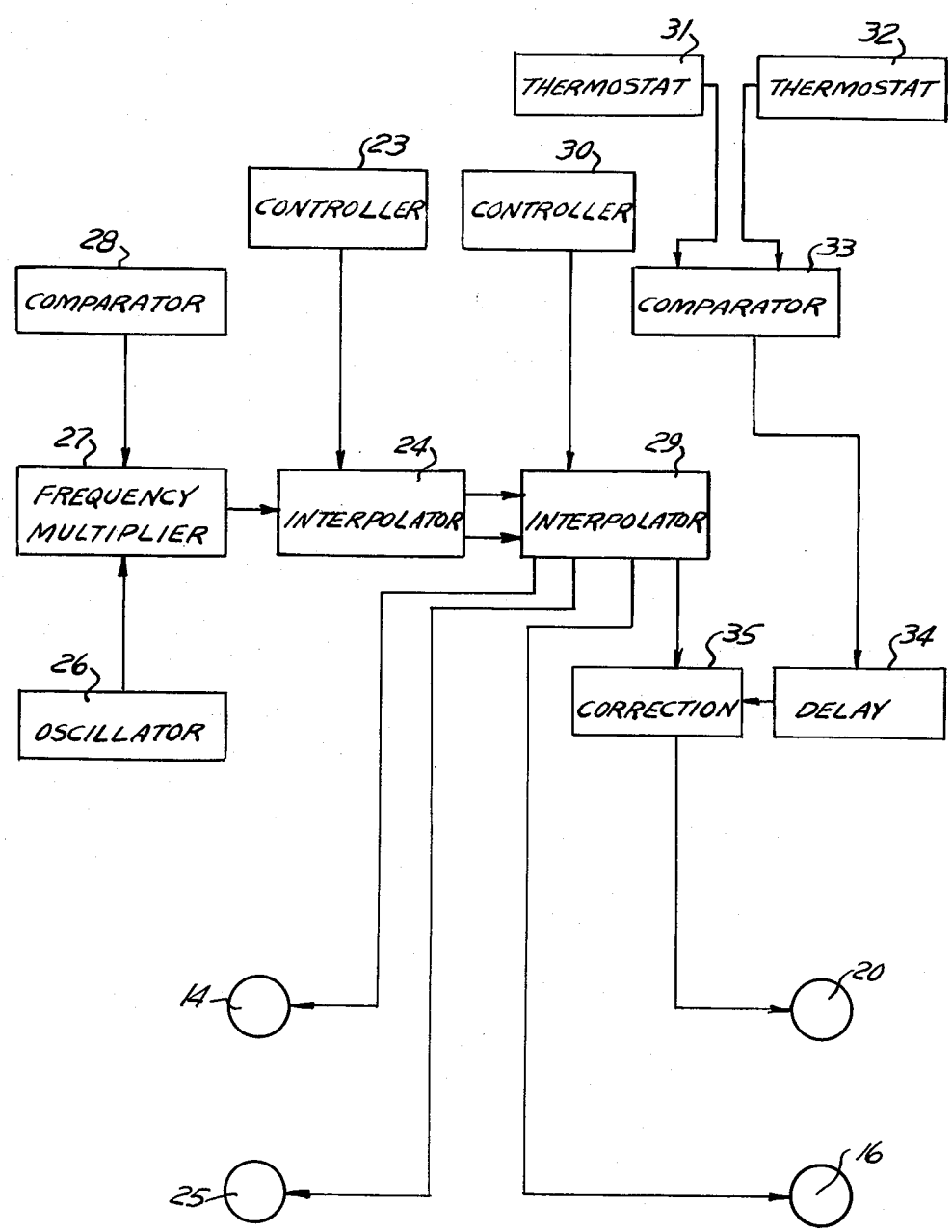
FIG. 2 is a block diagram illustrating the principle of numerical control of the servo motors of the apparatus of FIG. 1.

FIG. 2 is a simplified functional block diagram of the control system for the servo motors shown at FIG. 1.

The program information data representing the cutting path is processed by a calculator or controller 23 which is connected to a first interpolator 24 whose output controls, through a second interpolator 29, the servo motors 14 and 25 displacing the workpiece 1 along the Y-axis and the electrode wire 2 along the X-axis respectively. The interpolator 24 receives pulses supplied by an oscillator 26 whose frequency is modulated by a frequency multiplier 27 placed under the control of a comparator circuit 28 which provides, in a well known manner, a signal which is a function of the difference between a magnitude representative of the conditions of machining, or electrical discharge quality, and a magnitude representing a reference value.

The second interpolator 29 receives from a second calculator or controller 30 processed information data relating to the inclination of the wire, that is to say to the conicity or draft of the cut in the workpiece. The second interpolator 29, which is connected to the first interpolator 24, modifies the command signals directed to the two servo motors 14 and 25 and supplies the command signals directed to the auxiliary servo motors 16 and 20, such as to provide a predetermined conicity or draft angle to the cut in the workpiece while maintaining the cutting path at the bottom of the workpiece along the appropriate co-ordinate points provided by the path program.

The arrangement of FIG. 2 is completed by an auxiliary control system for the servo motor 20 which provides compensation of the position errors caused by the changes in length, due to expansion or contraction, of the support arm 11, on which the lower guide member of the electrode wire is displaceable along the axis of the support arm by means of the auxiliary servo motor 20. The auxiliary control system comprises a pair of thermostats temperature measuring transducers 31 and 32 mounted, respectively, on the support arm 10 and on the support arm 11, and feeding their output signals into a comparator 33 having its output connected to a correction circuit 35 through a delay circuit 34. When the temperature at the lower support arm 11 changes relative to the temperature of the upper support arm 10, the comparator circuit 33 provides at its output a signal which is applied to the motor 20 with a delay corresponding to the thermal time constant of the support arm.

The correction unit 35 functions as a gate admitting either the command signals supplied by the interpolator 29 for controlling the inclination of the wire, or the command signals for compensating for the change in length of the support arm 11 caused by heat. The thermostats 31 and 32 could be placed at other locations, according to the design of the EDM machine, for example for measuring the temperature of the ambient atmosphere and the temperature of the machining fluid. The other servo motor 16 could also be used for compensating other thermal effects or mechanical distortions along the X-axis.

Having thus described the present invention by way of an example of structure, given for illustrative purpose only, modifications whereof will be apparent to those skilled in the art, what is claimed as new is as follows:

We claim:

1. In an apparatus for cutting by electrical discharges an electrode workpiece by means of a travelling electrode wire, said electrical discharges occurring in a machining zone between said electrode wire and said workpiece, said apparatus comprising a pair of electrode wire guide members mounted one on the end of a support arm and the other on the end of another support arm, said support arms being disposed parallel to each other on each side of the machining zone in the workpiece, and a pair of servo motors for displacing both said support arms in unison and said workpiece relative to each other along respective X- and Y-axes according to a predetermined path program, the improvement comprising a second pair of servo motors arranged one to displace one of said guide members in a first direction along the axis of its corresponding support arm and the other along a second direction perpendicular to the axis of its corresponding support arm such as to guide said wire with a predetermined inclination relative to said workpiece in the course of a cutting pass according to inclination information included in said path program, means for obtaining a pair of control signals from said program inclination information, means for controlling said one of said second pair of servo motors for displacing said one of said guide members relative to its corresponding support arm in said first direction as a function of one of said signals, and means for controlling the other of said second pair of servo motors for displacing the other of said guide members relative to its support arm in said second direction as a function of the other of said signals.

2. The improvement of claim 1 further comprising means for measuring the temperature of each of said support arms, means for determining the difference in temperature, and means for controlling said one of said second pair of servo motors for displacing said one of said guide members such as to compensate for difference in length of said support arms due to difference in temperature.

3. In an apparatus for cutting by electrical discharges an electrode workpiece by means of a travelling electrode wire, said apparatus comprising electrode wire guide members mounted each on the end of one of a pair of parallel support arms, one of said support arms being disposed above the workpiece and the other below the workpiece, a first pair of servo motors for displacing both said support arms in unison and said workpiece relative to each other along respective X- and Y-axes according to a predetermined path program, the improvement comprising means for measuring the temperature difference between said support arms and means for displacing one of said guide members along the axis of its support arm such as to compensate for difference in length of said support arms due to the difference in temperature.

* * * * *

UNITED STATES PATENT AND TRADEMARK OFFICE
CERTIFICATE OF CORRECTION

PATENT NO. : 4,363,949
DATED : December 14, 1982
INVENTOR(S) : Jean Pfau and Benno Ibo Bonga It is certified that error appears in the above-identified patent and that said Letters Patent are hereby corrected as shown below:

Col. 3, line 7, delete "22", line 62, before "temperature" insert --or--.

Signed and Sealed this

Twenty-sixth Day of April 1983

[SEAL]

Attest:

GERALD J. MOSSINGHOFF

Attesting Officer

Commissioner of Patents and Trademarks